(12) United States Patent
Wang et al.

(10) Patent No.: US 7,274,510 B2
(45) Date of Patent: Sep. 25, 2007

(54) CIRCULATOR AND POLARIZATION BEAM COMBINER

(75) Inventors: Zheng Wang, San Jose, CA (US); Qi Deng, Cupertino, CA (US); Yonglin Huang, Milpitas, CA (US); Frank Levinson, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 294 days.

(21) Appl. No.: 10/387,648

(22) Filed: Mar. 13, 2003

(65) Prior Publication Data

US 2004/0179265 A1    Sep. 16, 2004

(51) Int. Cl.
*G02B 5/30* (2006.01)
*G02B 27/28* (2006.01)

(52) U.S. Cl. ............... 359/495; 359/494; 359/497
(58) Field of Classification Search ........... 359/484, 359/494–497, 48; 398/79
See application file for complete search history.

(56) References Cited

U.S. PATENT DOCUMENTS

| | | | |
|---|---|---|---|
| 5,909,310 A * | 6/1999 | Li et al. ............... | 359/484 |
| 5,930,039 A * | 7/1999 | Li et al. ............... | 359/484 |
| 5,982,539 A * | 11/1999 | Shirasaki ............. | 359/484 |
| 6,049,426 A * | 4/2000 | Xie et al. ............. | 359/484 |
| 6,175,448 B1 * | 1/2001 | Xie et al. ............. | 359/497 |
| 6,178,044 B1 * | 1/2001 | Li et al. ............... | 359/484 |
| 6,212,008 B1 * | 4/2001 | Xie et al. ............. | 359/484 |
| 6,373,604 B1 | 4/2002 | Xie ...................... | 359/124 |
| 6,674,968 B1 * | 1/2004 | Xie ...................... | 398/79 |
| 6,795,242 B2 * | 9/2004 | Pan et al. ............. | 359/484 |
| 2006/0098205 A1 * | 5/2006 | Townley-Smith et al. | 356/487 |

* cited by examiner

*Primary Examiner*—Stephone B. Allen
*Assistant Examiner*—Aline D. McNaull
(74) *Attorney, Agent, or Firm*—Workman Nydegger (57) ABSTRACT

System and techniques for reducing the polarization dependency of an optical component by combining the actions of a circulator and a polarization beam combiner to separate an optical signal into a plurality of orthogonally oriented polarization components; rotate at least one of the components so that the polarization orientation of the components are parallel; propagate the components through respective input ports of an optical component at substantially the same time; rotate at least one of a plurality of output components from the optical component so that the polarization orientation of the output components are orthogonal; and recombine the plurality of output components into an output optical signal.

14 Claims, 7 Drawing Sheets

CIRCULATOR AND POLARIZATION BEAM COMBINER

BACKGROUND

The following description relates to systems and techniques for reducing the polarization mode dependency of an optical device. The techniques may be used on in conjunction with optical devices such as those used in optical communications systems.

Different optical devices, including optical amplifiers, optical filters and combined optical, amplifying filters may be used in optical communication systems. These devices may be integrated in, for example, components such as switches, routers, multiplexers and other components for optical-signal-processing.

Optical signals that are employed in communication systems may be polarized and may include more than one polarization mode. Two polarization modes are known as transverse-electrical (TE) and transverse-magnetic (TM). The optical signals may propagate through the communication system on optical fibers and may have an arbitrary polarization state. The TM component may be thought of as propagating perpendicular to an axis of the optical waveguide and the TE polarization mode may be thought of as propagating parallel to the axis of the optical waveguide.

The performance of some optical components, including optical amplifiers and optical waveguide coupled components used in an optical communication system, may depend upon the polarization state of an incident optical signal received by the component. The optical devices may be polarization-dependent, meaning that the device has a different influence on the different modes of an incident signal.

Incident signals with different polarization states may be affected by an optical device in different ways. In an optical amplifier, for example, the modal gain may be polarization mode dependent. The gain of the transverse-electrical and transverse-mechanical waves may be different. This variation in the response of an optical device to the different polarization states is known as polarization mode dispersion (PMD). Polarization mode dispersion is an inherent property of optical media. It can be caused by the difference in the propagation velocities of light in the orthogonal principal polarization states of the transmission medium. The net effect is that if an optical pulse contains both polarization components, then the different polarization components will travel at different speeds and arrive at different times, smearing the resultant optical signal. One result is that the gain may differ for TE-polarized and TM-polarized waves. The difference in gain between the differently polarized waves may result in an amplification of the TM wave that is different from the TE wave. Thus, the output optical signal from the amplifier may include TM and TE polarized waves that are in a different proportion than the input optical signal. The output signal of a polarization mode dependent device may have a different polarization state than the incident received signal.

SUMMARY OF THE DISCLOSURE

The present application teaches systems and techniques for reducing the polarization dependency of an optical component.

In one aspect, reducing the polarization dependency of an optical component is facilitated by separating an optical signal into a plurality of orthogonally oriented polarization components. At least one of the components is rotated so that the polarization orientation of the components are parallel and then the components are propagated through respective input ports of an optical component at substantially the same time. At least one of the output components of the optical component is rotated so that the polarization orientation of the output components are orthogonal. The orthogonal components are recombined into an output optical signal.

In another implementation, the optical component is bi-directional.

In another implementation, the optical component is an optical amplifier.

In another aspect, a device for reducing the polarization dependency of an optical component is disclosed. The device includes an imaging element to receive an input optical signal from an input waveguide or provide an output optical signal to an output waveguide. A beam displacer/combiner is optically coupled to the first imaging element to split the input optical signal into a plurality of polarization component beams or to combine a plurality polarization component beams into the output optical signal. A first half-wave plate is optically coupled to the beam displacer to rotate a polarization orientation of the polarization component beams. A first nonreciprocal polarization rotator is optically coupled to the first half-wave plate to rotate the polarization orientation of the polarization component beams. A first beam angle turner is optically coupled to the first nonreciprocal polarization rotator to turn the polarization component beams through an angle, wherein a path of a polarized beam converges to or diverges from the longitudinal axis of the optical device depending upon the propagation direction of the polarization component beam. A second beam angle turner is optically coupled to the first beam angle turner to turn the polarization component beams through an angle, wherein the path of a polarized beam converges to or diverges from the longitudinal axis of the optical device depending upon the propagation direction of the polarization component beam. A second half-wave plate is optically coupled to the second beam angle turner to rotate the polarization orientation of the polarization component beams and a second nonreciprocal polarization rotator is optically coupled to the second half-wave plate to rotate the polarization orientation of the polarization component beams. A prism is optically coupled to the second half-wave plate o turn the polarization component beams through an angle toward the longitudinal axis and a second imaging element is optically coupled to the prism to couple the polarization component beams into respective inputs of a polarization dependent component or couple output polarization component beams from the polarization dependent component into the optical device.

In some implementations, techniques described here may provide one or more of the following advantages. The technique may enable the use of a single optical device to amplify an optical signal. The technique can reduce signal distortion of some optical devices. The modal components of the signal pass through the same optical loop and, therefore, may have substantially the same transfer function. The technique may be incorporated into the same package as an optical device, thereby reducing the assembly time and complexity.

Details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

The systems and techniques described here relate to reducing polarization mode dependency of optical components. The techniques may include passing an incident light beam signal through an optical circulator to direct the incident signal to a polarization beam combiner/splitter (PBC) that splits the beam into polarization components. The PBC output signals are provided to respective inputs of a bi-directional optical component. The resultant signals from the optical component are re-combined in the PBC. The combined signal is provided to the circulator, which directs the re-combined signal from the PBC to an output port. Thus, a reduced polarization mode dependent optical amplifier, for example, includes a circulator, a PBC and an optical amplifier. In an alternative implementation, an optical device is disclosed that performs both the function of a circulator and a PBC. The circulator and the PBC may be included in the same package as the optical component.

Figure 1:
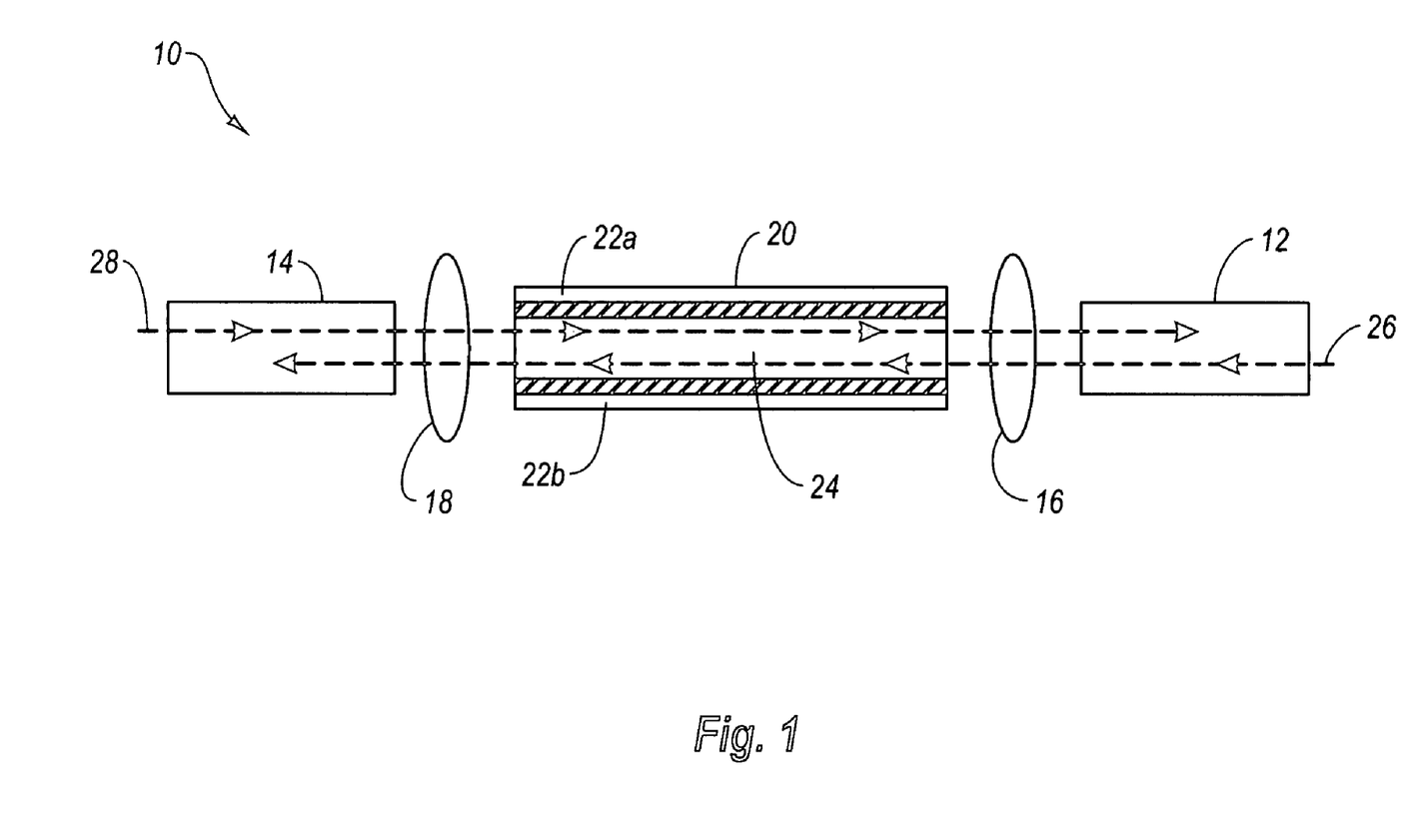
FIG. 1 is a cross-sectional view of an optical amplifier.

FIG. 1 illustrates a semiconductor optical amplifier assembly 10. Optical waveguides 12 and 14 are input and output single-mode waveguides, respectively. Single-mode optical waveguides are waveguides that propagate only one polarization mode of light. Imaging elements 16 and 18 may be disposed between the input and output waveguides 12 and 14. A semiconductor optical amplifier (SOA) 20 is disposed between the imaging elements, 16 and 18. Each waveguide, 12 and 14, can provide incident optical signals to the SOA and receive optical signals from the SOA. SOA 20 is illustrated in a cross-sectional view. The amplifier may have an active layer 24 and a cladding layer 22 which, in cross-section, has an upper cladding layer 22a and lower cladding layer 22b.

A semiconductor optical amplifier is a bi-directional optical component. A bi-directional component can operate in both directions regardless of the direction a light signal passes through it. Incident light beam signals 26 and 28 may propagate through the SOA in forward and a reverse directions, respectively. Beams 26, 28 may be coupled to the amplifier 20 by imaging elements 16, 18, respectively. The light intensity of each beam may increase as the beam propagates through the amplifier. Forward propagating beam 26 may then pass through imaging element 18 and may be provided to fiber 14. Similarly, reverse propagating beam 28 then passes through imaging element 16 and is provided to fiber 12.

The modal gain of the amplifier may be different for different polarization modes of an incident beam. The transverse-magnetic TM and transverse-electric TE modes may have different gains due to intrinsic characteristics of the optical amplifier and may result in degradation of the incident signal.

Figure 2:
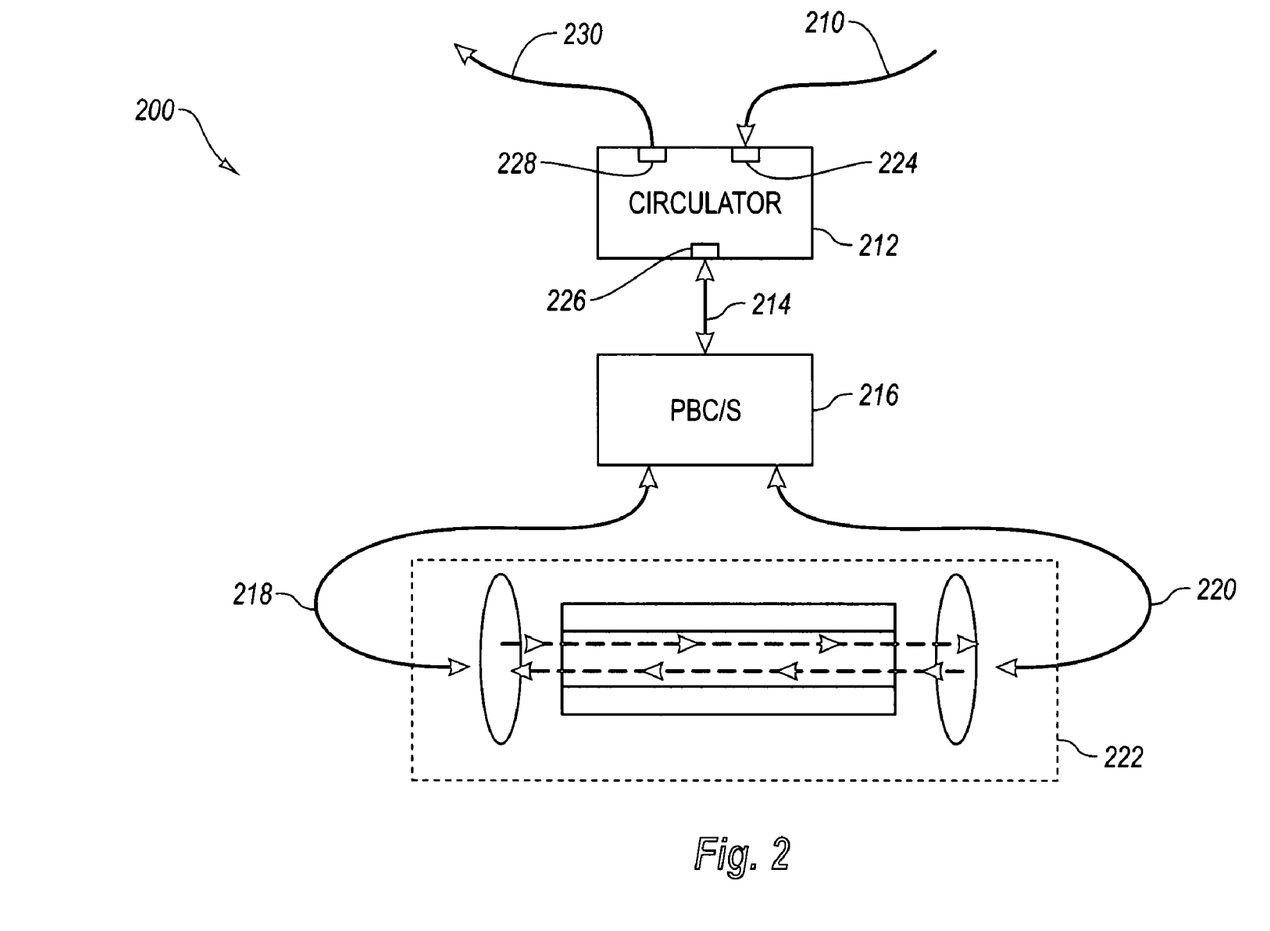
FIG. 2 is a block diagram an implementation of circulator and polarization beam combiner coupled to an optical amplifier.

FIG. 2 is a block diagram 200 of an implementation of an optical system that includes a circulator and polarization beam combiner/splitter. An incident optical signal may be provided on an input waveguide 210 to a first port 224 of a circulator 212. A single-mode waveguide 214 may optically couple a second port 226 of the circulator to a polarization beam combiner/splitter (PBC) 216. Waveguides 218, 220 may optically couple PBC 216 outputs to respective inputs of a polarization dependent optical component 222, such as an optical amplifier. Outputs from the optical component 222 may be coupled to the PBC by the waveguides 218, 220. Output from the PBC may be coupled back to the circulator 212. Circulator 212 may direct the PBC output to a circulator third port 228 which, in turn, may be coupled to an output optical waveguide 230.

In an implementation, an input optical signal may be received by the first port 224 of the circulator 212 on the input optical waveguide 210. A feature of the circulator is to provide an input on the first port 224 as an output on the second port 226 and to provide an input on the second port as an output on the third port 228. Thus, the input optical signal incident on the circulator first port 224 may be provided as an output signal on the circulator second port 226. The waveguide 214 couples the optical signal on port 226 to the PBC 216.

The input optical signal may have more than one polarization component. The optical signal may have orthogonal transverse-magnetic (TM) and transverse-electrical (TE) polarization modes. The PBC 216 can split the optical signal provided on waveguide 214 into its TM and TE polarization components. The PBC also may be arranged to rotate one of the polarization components so that both modes propagate in the same orientation with respect to an optical waveguide. One polarized component beam may be provided to the optical component 222 on a first polarization-maintaining (PM) waveguide 220. A second polarization component may be provided to the optical component 222 on a second PM waveguide 218. Each polarization mode propagates through the optical component in a different direction. For example, the TE component may propagate in a forward direction through the optical component and the TM component in a reverse direction. The optical component may operate on both polarized components in substantially the same way because both components have the same orientation with respect to the axis of propagation.

The output of the optical component resulting from the polarized component beam on first PM waveguide 220 may be provided to the PBC on the second PM waveguide 218. Similarly, the output of the optical component resulting from the polarized component beam on second PM waveguide 218 may be provided to the PBC on the first PM waveguide 220. The PBC may be arranged to rotate the previously rotated component back to the original orientation and subsequently re-combine the components into a single signal. The re-combined signal may be provided as an input to the circulator's second port 226 on waveguide 214. As stated above, an input on the second port 226 may be provided by the circulator 222 as an output signal on the third port 228. An output waveguide 230 may be coupled to the third port 228 to propagate the output optical signal.

Figure 3:
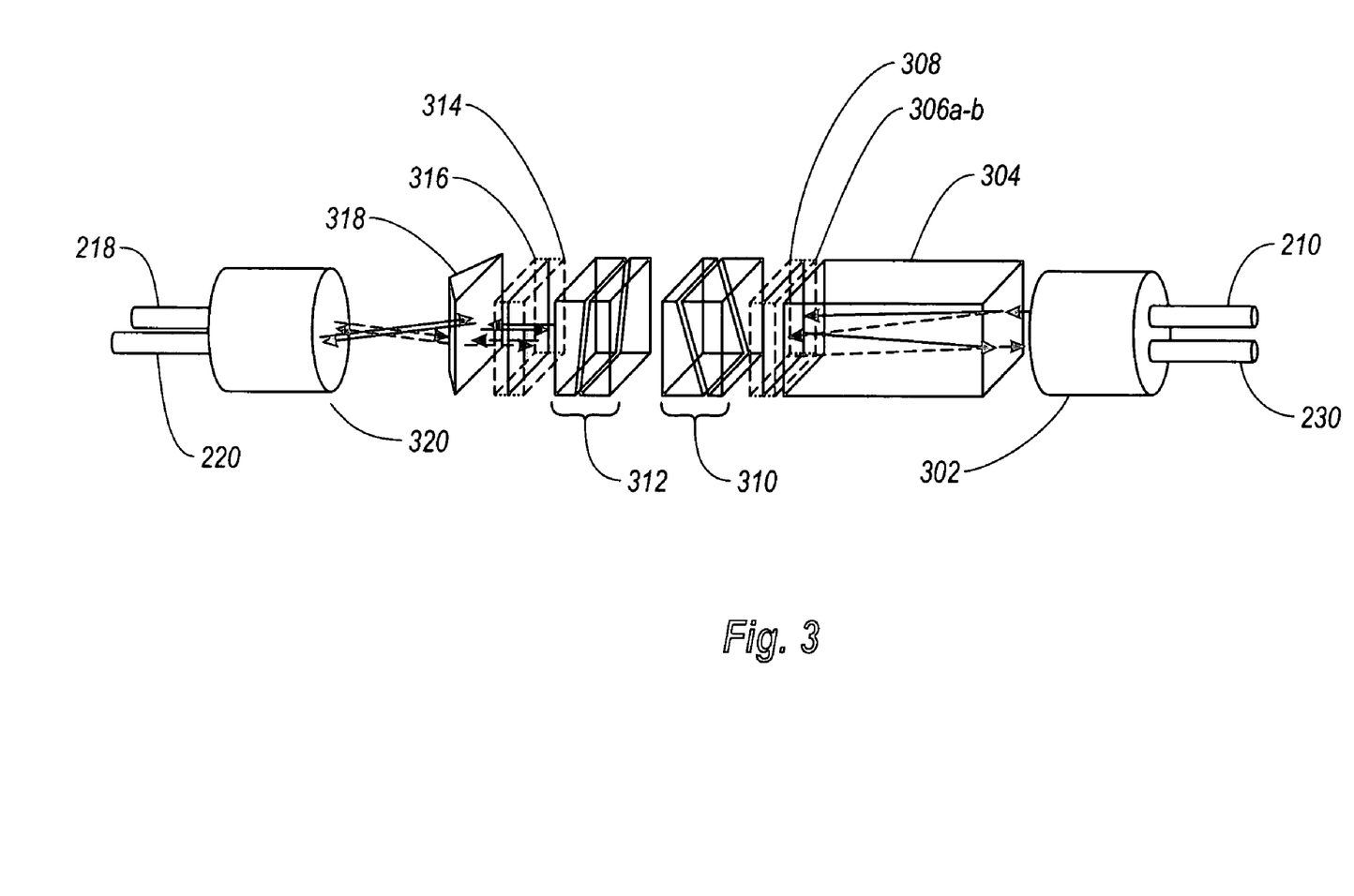
FIG. 3 is an isometric view of the elements of an implementation of a circulator and polarization beam combiner.

FIG. 3 is an isometric illustration of an implementation of the disclosed optical device that functions as a combined circulator and polarization beam combiner. The device has first and second optical ports at a proximal end that may be coupled to an input optical signal on a waveguide 210 and an output optical signal waveguide 230, respectively. The device has third and fourth optical ports at a distal end that may be coupled to waveguides 218 and 220, respectively, which, in turn, are coupled to a polarization dependent optical component (not shown). The elements of the device are arranged sequentially from the proximal end to the distal end and are optically coupled one to another along a longitudinal axis. The device may include a first imaging element 302, a beam displacer 304, a first half-wave plate 306a-b a first nonreciprocal beam rotator 308, two beam angle turners 310, 312, a second half-wave plate 314, a second nonreciprocal beam rotator 316, a prism 318 and a second imaging element 320.

First imaging element 302 is disposed along an optical path of the device and optically coupled to the input and output optical waveguides 210, 230. Second imaging element 320 is disposed along the optical path and coupled to first and second PM waveguides 218, 220. The imaging elements 302 and 320 include, for example, a collimating lens or graded index of refraction (GRIN) lenses. As shown in FIG. 3, the beam displacer/combiner 304 may be optically coupled to the first imaging element 302. In one embodiment, the beam displacer/combiner includes a birefringent crystal. The crystal may be made, for example, of yttrium orthovanadate (YVO$_4$), rutile or barium borate (α-BBO). A first half-wave plate 306 is optically coupled to the beam displacer 304 and arranged to rotate the polarization state of a polarized beam component. The half-wave plate 306 is arranged so that segments 306a and 306b have different optical axes of rotation. The first nonreciprocal beam rotator 308 is optically coupled to the first half-wave plate 306. In an embodiment, the first and second nonreciprocal rotators are nonreciprocal Faraday polarization rotators and may be made, for example, of yttrium-iron-garnet (YIG), or Bi-added thick film crystals. The Bi-added thick film crystals may include a combination of (YbTbBi)$_3$Fe$_5$O$_{12}$ and (GdBi)$_3$(FeAlGa)$_5$O$_{12}$, or of YIG and Y$_{3-x}$Bi$_x$Fe$_5$O$_{12}$. Beam angle turners 310, 312 may be, for example, birefringent wedges and optically coupled distally from the first nonreciprocal beam rotator.

The first and second beam angle turners 310, 312 change a beam propagation direction depending upon the beam polarization orientation and propagation direction. In an embodiment, the first and second beam angle turners may be Rochon prisms, Wollaston prisms, or modified Wollaston or Rochon prisms.

The modified Rochon and Wollaston prisms differ from conventional Rochon and Wollaston prisms in the orientation of the optical axes of its wedges. In a modified Rochon prism, the optical axis of one of the wedges is oriented normal to the plane of normal incidence, which is the same as in a conventional Rochon prism. However, the optical axis in the other wedge is oriented forty-five degrees in the plane of normal incidence with respect to the optical axis orientation the wedge would possess in a conventional Rochon prism. Similarly, in a modified Wollaston prism, the optical axis of each of its birefringent wedges are oriented perpendicularly to each other and forty-five degrees in the plane of normal incidence with respect to the optical axis in a conventional Wollaston prism.

The second half-waveplate 314 is optically coupled to the second beam angle turner 312. Second nonreciprocal polarization rotator 316 is optically coupled distally to the second half-wave plate. Prism 318 is optically coupled to the second nonreciprocal polarization rotator 316 and is optically coupled to second imaging element 320.

Figure 4A:
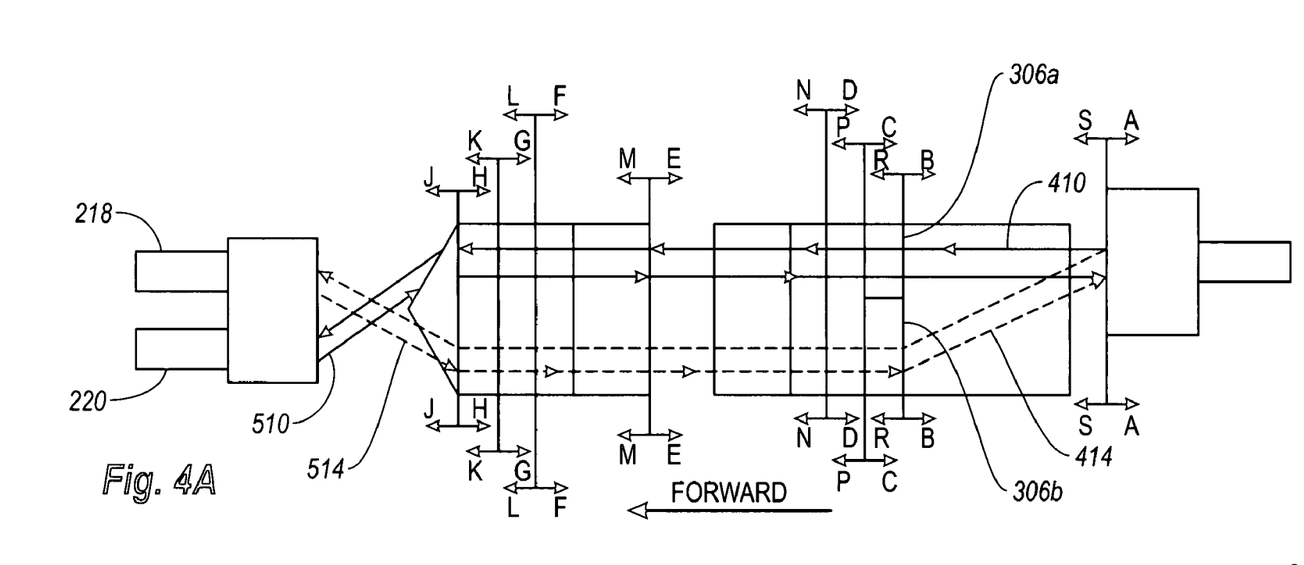
FIGS. 4A-B illustrate a top and side view, respectively, of the circulator and polarization beam combiner of FIG. 3.
Figure 4B:
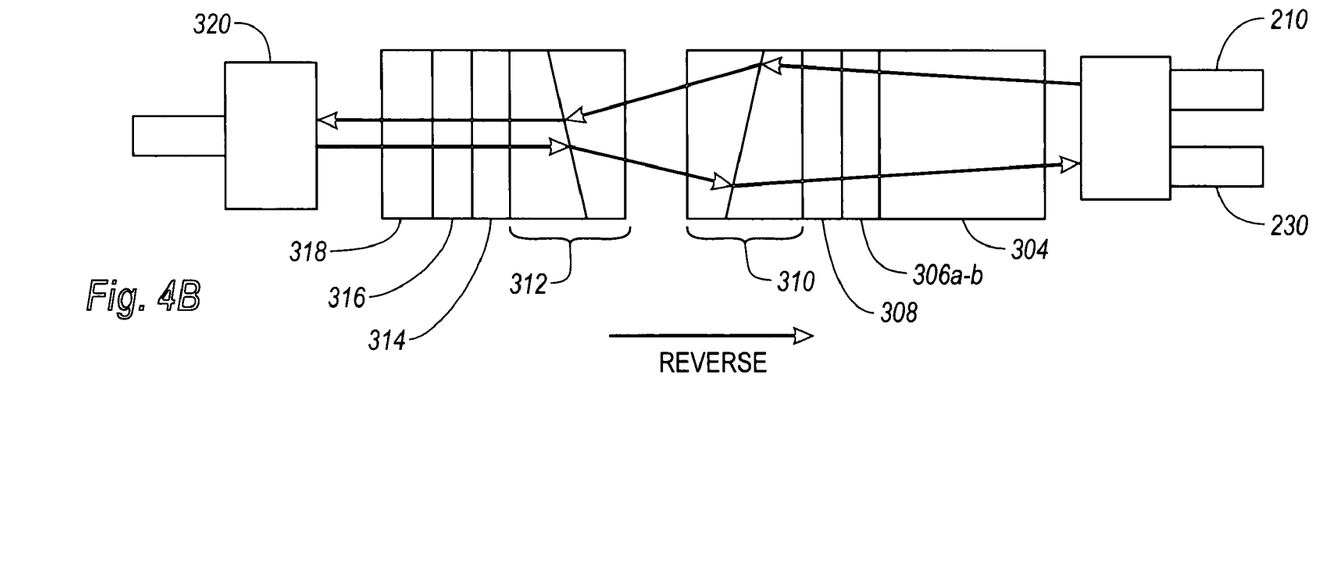
Figure 5A:
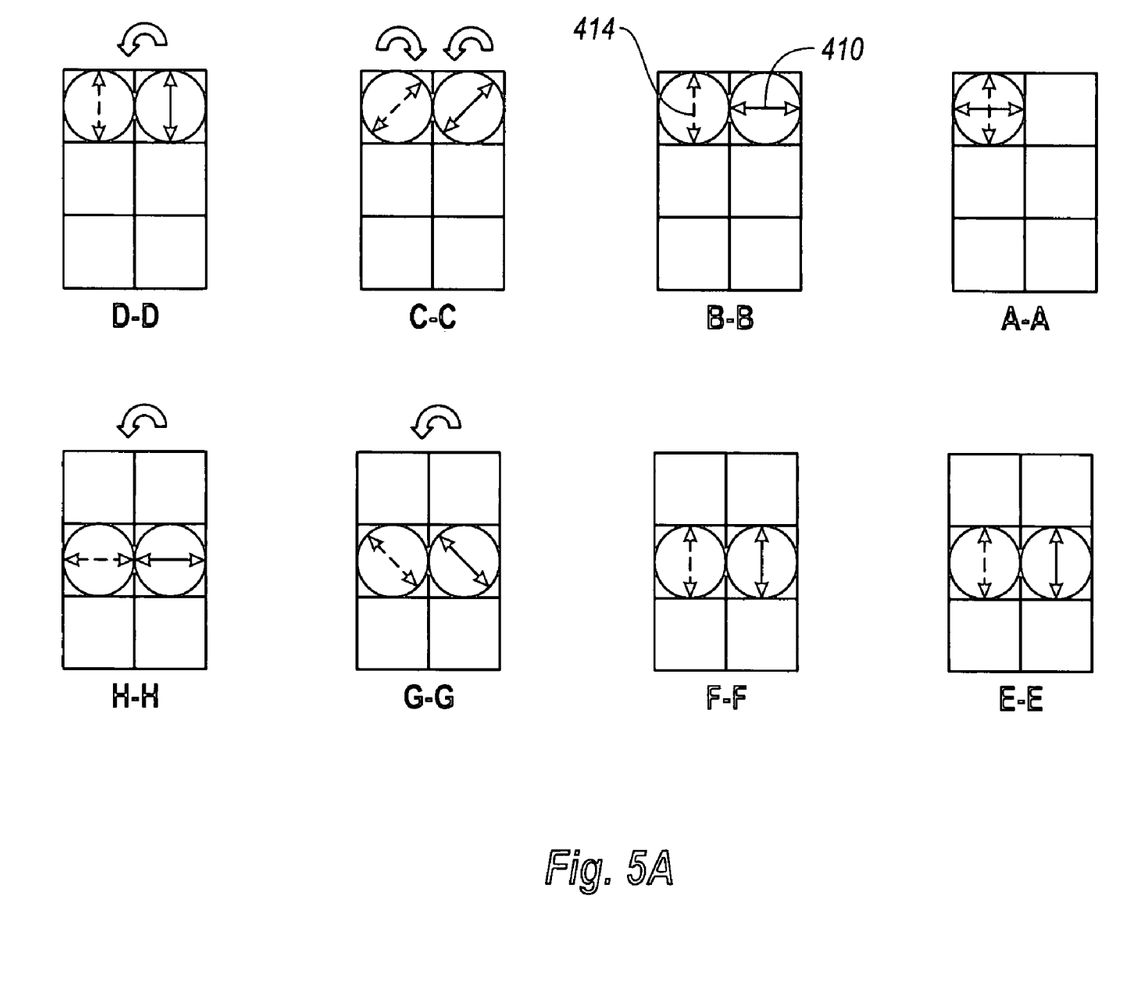
FIGS. 5A-B is a cross-sectional view showing the spatial location and polarization states of the component beams propagating through the circulator and polarization beam combiner of FIG. 3.

FIGS. 4A and 4B illustrate a top and front view, respectively, of the implementation of the combined circulator and PBC of FIG. 3. FIG. 5A is a cross-sectional view showing the spatial location and polarization states of the component beams propagating in a forward direction through the combined device. The combined device performs both the function of the circulator 212 and PBC 216 of FIG. 2 by splitting an input signal on a waveguide 210 into polarized beam components in a forward direction, rotating the polarization direction of at least one of the component beams so that the components are polarized in the same orientation, and propagating the component beams to waveguides 218 and 220, respectively. In the reverse direction, the device receives input component signals on waveguides 218 and 220 that have the same polarization orientation, rotates at least one of the components so that the polarization orientation of the components are orthogonal and combines both components into an output optical signal coupled to output waveguide 230.

Operation of the combined circulator and PBC in the forward direction will now be described with reference to FIGS. 4A-B and 5A. An input beam on waveguide 210 exits first imaging element 302. FIG. 5A (section A-A) illustrates that the input beam includes two orthogonal light components. The input beam then enters beam displacer/combiner 304, which acts as a polarization sensitive beam displacement plate. The input signal is decomposed into two orthogonal polarization components. Within the first beam displacer/combiner, the first polarized component beam may be referred to as an ordinary light ray (o-ray) 410 and the other component may be referred to as an extraordinary light ray (e-ray) 412. The e-ray 410 walks off from the o-ray 414 through the beam displacer/combiner, with the result that there is a separation between the polarized beam components as illustrated in FIG. 5A (section B-B). Component beams 410 and 414 propagate through first half-wave plate 306a and 306b, respectively. In this implementation, the half-wave plate rotates the polarization of the e-ray forty-five degrees counter-clockwise and the o-ray forty-five degrees clockwise. The component beams have the polarization orientation and spatial relationship illustrated in FIG. 5A (section C-C)

The components 410, 414 then enter first nonreciprocal rotators 308. The nonreciprocal rotator rotates the polarization orientation of both the e-ray and the o-ray forty-five degrees counter-clockwise and the polarization orientation of the components is illustrated in FIG. 5A (section D-D). Thus, the o-ray has the same polarization orientation as the input light beam and the polarization direction of the e-ray has been rotated so that both components now have the same polarization orientation but are spaced apart by the walk-off distance.

Upon exiting the first nonreciprocal rotator 308, both polarization components have the same polarization orientation before entering first beam angle turner 310. First beam angle turner 310 turns both components towards the longitudinal axis of the optical device 416. The components then exit the first beam angle turner and next propagate through second beam angle turner 312, which is arranged to bend the components such that they are aligned with the longitudinal axis of second half-wave plate 314. The polarization orientation remains the same as the components bend toward substantially the longitudinal axis of the device as illustrated in FIG. 5A (sections E-E and F-F).

The component beams 410, 414 exit the second beam angle turner 312 and propagate through second half-wave plate 314. Both the e-ray and the o-ray pass through the half-wave plate 314 that is arranged to rotate the polarization orientation forty-five degrees counterclockwise. as illustrated in FIG. 5A (section G-G). The waves then propagate through the second nonreciprocal rotator 316 and the polarization orientation id rotated another forty-five degrees in the counter-clockwise direction as illustrated in FIG. 5A (section H-H). Thus, the input beam on waveguide 210 as illustrated at FIG. 5A (section A-A), has been split into separate polarization components 410 and 414 having the same polarization orientation and separated by a walk off distance. The separated polarized beam components may bend toward the center after they propagate through a prism 318 and couple into two polarization maintaining fibers 218, 220 separately through the second imaging element 320.

The e-ray and the o-ray have the same polarization orientation and may be operated on by an optical component such as a semiconductor optical amplifier. A single amplifier may be used to amplify both polarization components by sending one component through the amplifier in a first direction and the other component in a second direction. Because the polarized components have the same polarization orientation, the amplifier will operate substantially the same on both components. After the polarization components exit respective sides of the amplifier, the polarized components will have the same polarization orientation.

As described above, in the reverse direction the combined circulator and PBC can operate on polarization component beams having the same polarization orientation, rotate at least one of the components so that the components have orthogonal polarization orientation and combine the components into a single output optical signal.

Figure 5B:
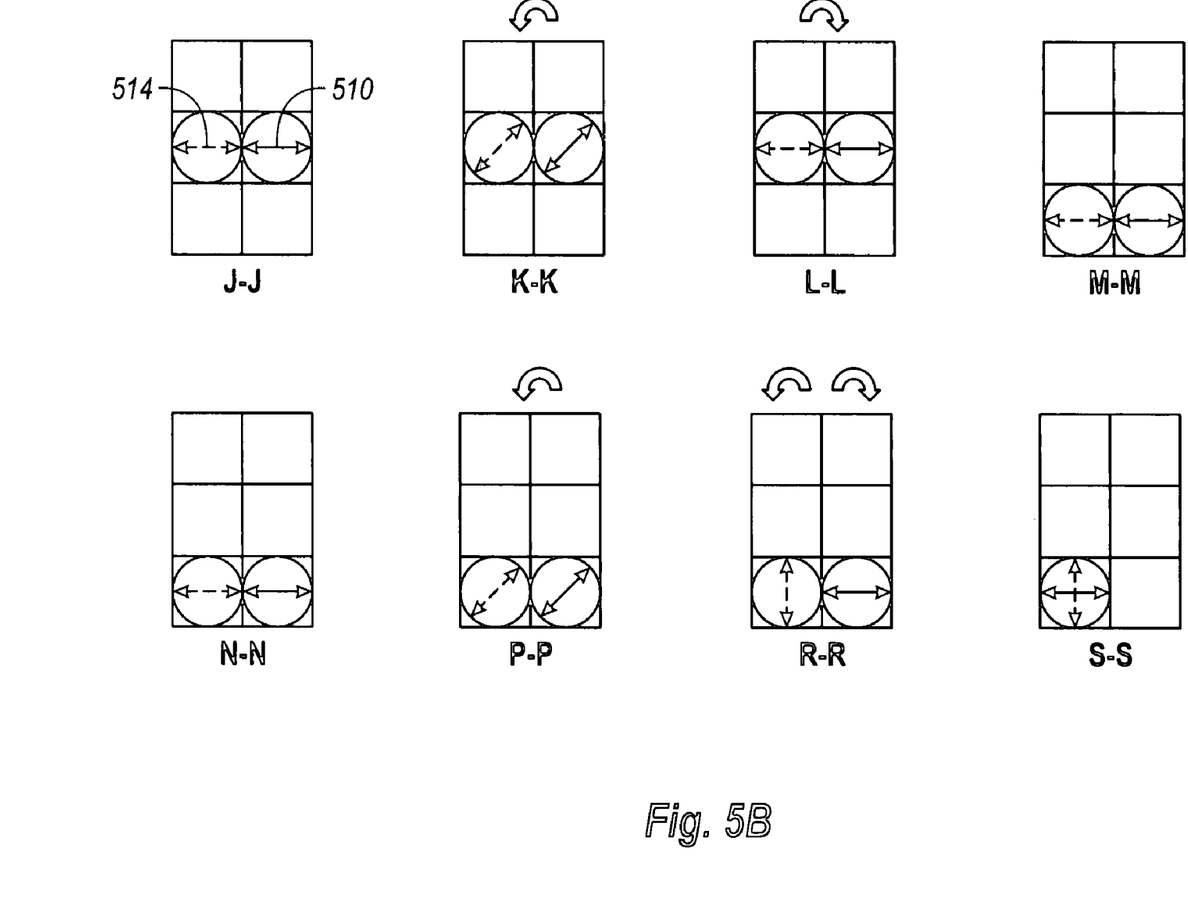

Operation of the combined circulator and PBC in the reverse direction will now be described with reference to FIGS. 4A-B and 5B. Each of two polarization component beams are received on PM fibers 218 and 220, respectively. The polarization component beams are propagated through the second imaging element 320 and prism 318 into two parallel beams as illustrated in FIG. 5B (section J-J). The two polarization component beams are an o-ray 510 and an e-ray 514.

The components 510, 514 then propagate into second nonreciprocal rotator 308. The nonreciprocal rotator rotates the polarization orientation of both the e-ray and the o-ray forty-five degrees counter-clockwise and the polarization orientation of the components is illustrated in FIG. 5B (section K-K). A feature of the nonreciprocal rotator is that the rotation of the polarization direction is the same for rays traveling in either direction through the nonreciprocal rotator.

Component beams 510 and 514 propagate through second half-wave plate 314. The second half-wave plate 314 rotates the polarization of both the e-ray and o-ray forty-five degrees clockwise, the direction of rotation being dependent on the direction of the component beam through the plate. The component beams have the polarization orientation and spatial relationship illustrated in FIG. 5B (section L-L). Both the e-ray and the o-ray have the same polarization orientation before propagating through the second beam angle turner 312. Because the polarization orientation of the two beams are different than the forward propagating beams (compare FIG. 5B section L-L to FIG. 5A section C-C), the rays will be bent in a direction opposite to the forward propagating wave. In this implementation, the o-ray and the e-ray are bent away from the longitudinal axis. Component beams 510 and 514 propagate through the first beam angle turner 310 that is arranged to bend the beams substantially in the same direction as the longitudinal axis of the optical device. The component beams have the same polarization orientation but are offset from the longitudinal axis of the optical device as illustrated in FIG. 5B (sections M-M and N-N).

The components 510, 514 then enter first nonreciprocal rotators 308. The nonreciprocal rotator rotates the polarization orientation of both the e-ray and the o-ray forty-five degrees counter-clockwise and the polarization orientation of the components is illustrated in FIG. 5B (section P-P). Component beams 510 and 514 propagate through first half-wave plate 306a and 306b, respectively. In this implementation, the half-wave plate rotates the polarization of the e-ray forty-five degrees clockwise and the o-ray forty-five degrees counter-clockwise. The component beams have polarization orientations that are orthogonal as illustrated in FIG. 5B (section R-R).

The polarization components 510 and 514 then propagate through the beam displacer/combiner 304 where the components are recombined into the output optical and coupled to the output waveguide 230. Thus, the separate polarization components having a parallel polarization orientation on waveguides 218 and 220, respectively, have had the polarization direction of at least one of the components rotated so that the orientations are orthogonal and the beams combined and supplied as an output signal.

Figure 6:
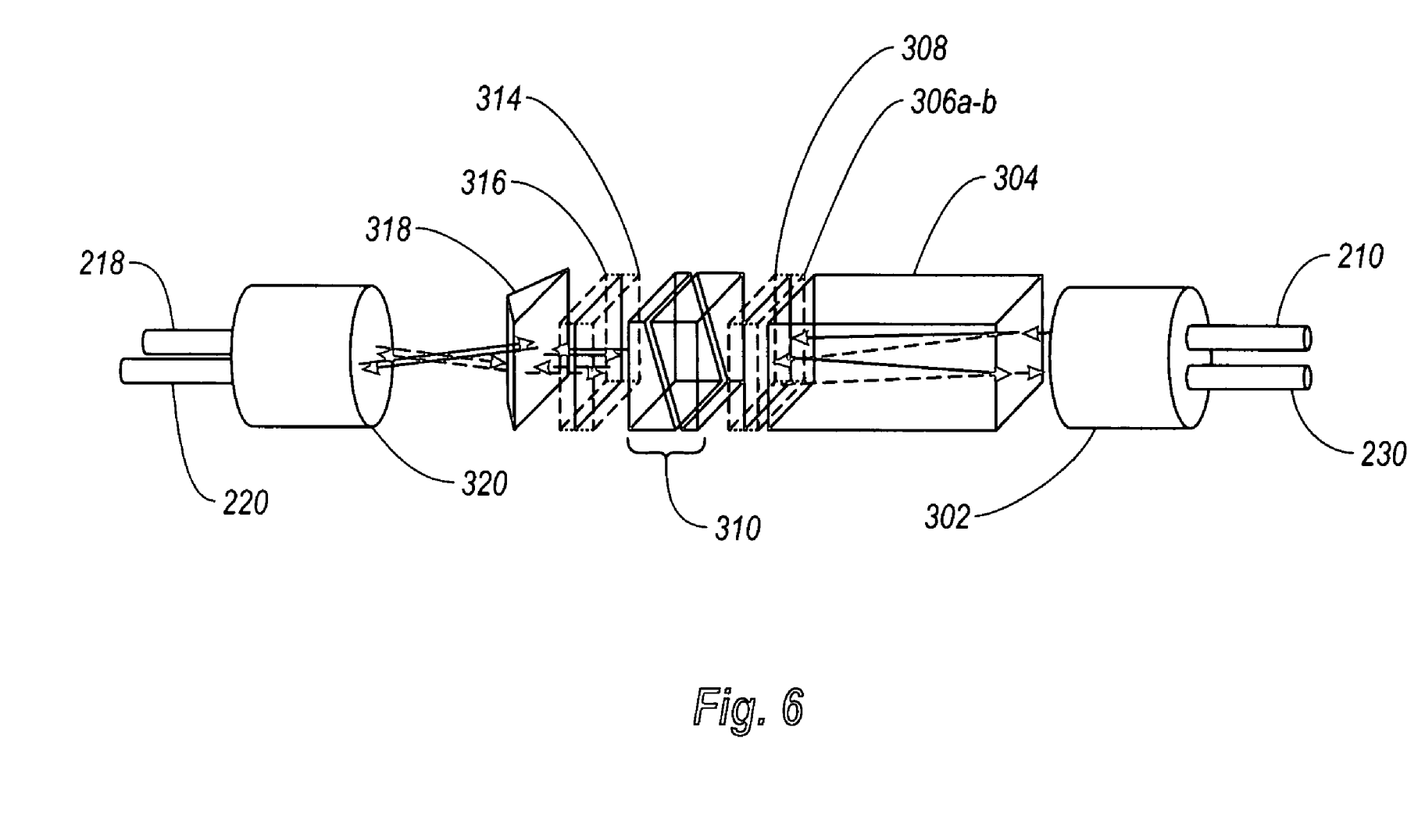
FIG. 6 is an isometric view of the elements of an alternative implementation of a circulator and polarization beam combiner.

FIG. 6 is an isometric illustration of an alternative implementation of the disclosed optical device that functions as a combined circulator and polarization beam combiner. The device has first and second optical ports at a first end that may be coupled to an input optical signal on a waveguide 210 and an output optical signal on waveguide 230, respectively. The device has third and fourth optical ports at a second end that may be coupled to waveguides 218 and 220, respectively, which, in turn, are coupled to a polarization-dependent optical component (not shown). The elements of the device may be arranged sequentially from the first end to the second end and are optically coupled one to another along a longitudinal axis. The device may include a first imaging element 302, a beam displacer 304, a first half-wave plate 306a-b a first nonreciprocal beam rotator 308, a beam angle turners 310, a second half-wave plate 314, a second nonreciprocal beam rotator 316, a prism 318 and a second imaging element 320.

The difference from the implementation disclosed in FIG. 3 is that in this alternative implementation of there is only one beam angle turner. The operation is substantially the same as described above in association with the description of FIG. 3. In this implementation, the beam angle turner 310 is arranged so that the two parallel polarization components 410, 414 (see FIG. 4A) are bent toward, and substantially parallel to, the longitudinal axis and after they propagate in a forward direction through one beam angle turner. In the reverse direction, the polarization components are bent away from, and essentially parallel to, the longitudinal axis of the device. Two beam angle turners may enable a smaller device than a single beam angle turner because of the focal length of the imaging devices 302, 320.

Other implementations are within the scope of the following claims.

What is claimed is:

1. An optical device comprising:
 a first imaging element to receive an input optical signal from an input waveguide or provide an output optical signal to an output waveguide;
 a beam displacer/combiner optically coupled to the first imaging element to split the input optical signal into a plurality of polarization component beams or to combine a plurality of polarization component beams into the output optical signal;
 a first half-wave plate optically coupled to the beam displacer/combiner to rotate a polarization orientation of the polarization component beams;
 a first nonreciprocal polarization rotator optically coupled to the first half-wave plate to rotate the polarization orientation of the polarization component beams;
 a first beam angle turner optically coupled to the first nonreciprocal polarization rotator to turn the polarization component beams through an angle, wherein a path of the polarization component beams converge to or diverge from the longitudinal axis of the optical device depending upon the propagation direction of the polarization component beams;
 a second beam angle turner optically coupled to the first beam angle turner to turn the polarization component beams through an angle, wherein the path of the polarization component beams converge to or diverge from a longitudinal axis of the optical device depending upon the propagation direction of the polarization component beams;
 a second half-wave plate optically coupled to the second beam angle turner to rotate the polarization orientation of the polarization component beams;
 a second nonreciprocal polarization rotator optically coupled to the second half-wave plate to rotate the polarization orientation of the polarization component beams;
 a prism optically coupled to the second half-wave plate to turn the polarization component beams through an angle toward the longitudinal axis; and
 a second imaging element optically coupled to the prism to couple the polarization component beams into respective inputs of a polarization dependent component or couple output polarization component beams from the polarization dependent component into the optical device.

2. The optical device of claim 1 wherein the first and second beam angle turners comprise birefringent wedges.

3. The optical device of claim 2 wherein the first and second beam angle turners comprise a member from the group of Rochon prisms, Wollaston prisms, modified Wollaston and modified Rochon prisms.

4. The optical device of claim 1 wherein the first and second nonreciprocal polarization rotators are Faraday rotators.

5. The optical device of claim 1 wherein the first and second imaging elements comprise collimating lenses.

6. The optical device of claim 5 wherein the collimating lenses comprise GRIN lenses.

7. The optical device of claim 1 wherein the beam displacer/combiner comprises at least one of $YVO_4$, calcite, rutile and barium borate.

8. An optical device comprising:
 a first imaging element disposed along a longitudinal axis of the optical device to receive an input optical signal from an input waveguide or provide an output optical signal to an output waveguide;
 a beam displacer/combiner optically coupled to the first imaging element to split the input optical signal into a plurality of polarization component beams or to combine a plurality of polarization component beams into the output optical signal;
 a first half-wave plate optically coupled to the beam displacer/combiner to rotate a polarization orientation of the polarization component beams;
 a first nonreciprocal polarization rotator optically coupled to the first half-wave plate to rotate the polarization orientation of the polarization component beams;
 a beam angle turner optically coupled to the first nonreciprocal polarization rotator to turn the polarization component beams through an angle, wherein a path of the polarization component beams converge to or diverge from a longitudinal axis of the optical device depending upon the propagation direction of the polarization component beams;
 a second half-wave plate optically coupled to the beam angle turner to rotate the polarization orientation of the polarization component beams;
 a second nonreciprocal polarization rotator optically coupled to the half-wave plate to rotate the polarization orientation of the polarization component beams;
 a prism optically coupled to the second half-wave plate to turn the polarization component beams through an angle toward the longitudinal axis; and
 a second imaging element optically coupled to the prism to couple the polarization component beams into respective inputs of a polarization dependent component or couple output polarization component beams having parallel oriented polarization from the polarization dependent component into the optical device.

9. The optical device of claim 8 wherein the beam angle turner comprises birefringent wedges.

10. The optical device of claim 9 wherein the first and second beam angle turners comprise a member from the group of Rochon prisms, Wollaston prisms, modified Wollaston or modified Rochon prisms.

11. The optical device of claim 8 wherein the first and second nonreciprocal polarization rotators are Faraday rotators.

12. The optical device of claim 8 wherein the first and second imaging elements comprise collimating lenses.

13. The optical device of claim 12 wherein the collimating lenses comprise GRIN lenses.

14. The optical device of claim 8 wherein the displacer/combiner comprises at least one of $YVO_4$, calcite, rutile or barium borate.

* * * * *

UNITED STATES PATENT AND TRADEMARK OFFICE
CERTIFICATE OF CORRECTION

| | | |
|---|---|---|
| PATENT NO. | : 7,274,510 B2 | Page 1 of 2 |
| APPLICATION NO. | : 10/387648 | |
| DATED | : September 25, 2007 | |
| INVENTOR(S) | : Wang et al. | |

It is certified that error appears in the above-identified patent and that said Letters Patent is hereby corrected as shown below:

Column 1
Line 8, change "on in" to --in--

Column 2
Line 22, change "plurality polarization" to --plurality of polarization--
Line 47, change "plate o" to --plate to--

Column 3
Line 4, change "diagram an" to --diagram of an--
Line 5, change "combiner" to --combiner/splitter-
Lines 8-9, change "combiner" to --displacer/combiner--
Line 11, change "combiner" to --displacer/combiner--
Line 15, change "combiner" to --displacer/combiner--
Line 18, change "combiner" to --displacer/combiner--
Line 32, change "re-combined" to --recombined--
Line 34, change "re-combined" to --recombined--
Line 59, change "a reverse" to --reverse--
Line 65, change "fiber" to --waveguide--
Line 67, change "fiber" to --waveguide--

Column 4
Line 48, change "component in" to --component may propagate in--
Line 57, change "on second" to --on the second--
Line 61, change "re-combine" to --recombine--
Line 62, change "re-combined" to --recombined--
Line 65, change "222" to --212--

Column 5
Line 6, change "signal waveguide" to --signal on a waveguide--

Signed and Sealed this
Twelfth Day of April, 2011

David J. Kappos
*Director of the United States Patent and Trademark Office*

CERTIFICATE OF CORRECTION (continued)
U.S. Pat. No. 7,274,510 B2

Line 14, change "displacer" to --displacer/combiner--
Line 32, change "displacer" to --displacer/combiner--
Line 54, change "its" to --their--
Line 67, change "polarization" to --beam--

Column 6
Line 3, change "polarization" to --beam--
Line 33, change "first beam" to --beam-- (CURS)
Line 37, change "(e-ray) 412." to --(e-ray) 414.--
Line 37, change "e-ray 410" to --e-ray 414--
Line 37, change "o-ray 414" to --o-ray 410--
Line 44, change "counter-clockwise" to --clockwise--
Line 45, change "clockwise" to --counterclockwise--
Line 49, change "rotators" to --rotator--
Line 51, change "counter-clockwise" to --counterclockwise--
Line 62, change "device 416." to --device.--

Column 7
Line 7, change "counterclockwise." to --counterclockwise--
Line 10, change "id" to --is--
Line 11, change "counter-clockwise" to --counterclockwise--
Line 18, change "fibers" to --waveguides--
Line 40, change "fibers" to --waveguides--
Line 46, change "components" to --component beams--
Line 47, change "308" to --316--
Line 49, change "counter-clockwise" to --counterclockwise--

Column 8
Line 12, change "rotators" to --rotator--
Line 14, change "counter-clockwise" to --counterclockwise--
Line 19, change "clockwise" to --counterclockwise--
Line 20, change "counter-clockwise" to --clockwise--
Line 25, change "optical and" to --optical signal and--
Line 26, change "230." to --230 (section S-S).--
Line 47, change "displacer" to --displacer/combiner--
Line 48, change "306*a-b*" to --306,--
Line 49, change "turners" to --turner--
Line 53, change "implementation of there" to --implementation there--
Line 59, change "and after" to --after--

Column 10
Claim 10, lines 44-45, change "first and second beam angle turners comprise" to --beam angle turner comprises--